United States Patent
Amemiya et al.

(10) Patent No.: US 6,525,342 B2
(45) Date of Patent: Feb. 25, 2003

(54) LOW RESISTANCE WIRING IN THE PERIPHERY REGION OF DISPLAYS

(75) Inventors: Takahisa Amemiya, Yamato (JP); Toshiaki Arai, Yokohama (JP); Evan George Colgan, Chestnut Ridge, NY (US); Yoshitami Sakaguchi, Hadano (JP); Kazumi Sakai, Moriyama (JP); Kai R. Schleupen, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/863,740

(22) Filed: May 23, 2001

(65) Prior Publication Data

US 2002/0177281 A1 Nov. 28, 2002

(51) Int. Cl.⁷ .............................................. H01L 29/04
(52) U.S. Cl. ........................ 257/59; 257/57; 257/59; 257/383; 257/384; 257/408; 257/751
(58) Field of Search ............................. 257/57, 59, 383, 257/384, 408, 751, 766

(56) References Cited

U.S. PATENT DOCUMENTS

| | | | |
|---|---|---|---|
| 6,252,247 B1 * | 6/2001 | Sakata et al. | 257/383 |
| 6,350,995 B1 * | 2/2002 | Sung et al. | 257/59 |
| 6,369,410 B1 * | 4/2002 | Yamazaki et al. | 257/412 |
| 6,380,558 B1 * | 4/2002 | Yamazaki et al. | 257/57 |

OTHER PUBLICATIONS

Ueki, T., *Requirements for Large Size and High Resolution TFT–LCDs*, International Display Manufacturers Conference, 2000 Digest, pp. 177–180.

Takatsuji, H., et al., *Nanometer–Scale Investigation of AL–Based Alloy Films for Thin–Film Transistor Liquid Crystal Display Arrays*, Materials Research Society Symposium Proceedings, vol. 471, 1997, pp. 99–105.

Herman, H. et al., *Thermal Spray: Current Status and Future Trends*, MRS Bulletin, Jul. 2000, pp. 17–25.

Takatsuji, H., et al., *Characterization of Transparent Conductors in Indium Zinc Oxide and their Application to Thin–Film–Transistor Liquid–Crystal Displays*, Materials Research Society Symposium Proceedings, vol. 508, pp. 315–320.

Libsch, F.R., et al., *Invited Paper: Next Generation TFT–Array Testing for High–Resolution/HighContent AMLCDs*, SID 99 Digest, , pp. 72–75.

Cuomo, F.P., et al. *Sub–Notebook a–Si Color SVGA Display with Integrated Drivers*, SID 98 Digest, pp. 967–970.

Kitahara, Hiroaki, *Invited Paper: Technology Trend of Large Size and High Resolution Direct–View TFT–LCD*, SID 00 Digest, pp. 1108–1111.

Kim, C.W., et al., *A Novel Four–Mask–Count Process Architecture for TFT–LCDs*, SID 00 Digest, pp. 1006–1009.

* cited by examiner

Primary Examiner—David Nelms
Assistant Examiner—Mai-Houng Tran
(74) Attorney, Agent, or Firm—F.Chau & Associates, LLP

(57) ABSTRACT

A display device comprises a gate metal and a data metal formed in an array region and in a periphery region outside of the array region of the display device. A planarizing layer is formed over the array region and the periphery region. Vias are patterned into the planarizing layer in the array region and the periphery region to expose portions of at least one of the gate metal and the data metal. A transparent conductor is deposited in the array region and the periphery region. A metal layer is locally deposited over the transparent conductor in selected areas of the periphery region. The metal layer and the transparent conductor are patterned to form an additional wiring level and/or to form connections between the gate metal and the data metal in the periphery region and to form transparent pixel electrodes in the array region.

17 Claims, 10 Drawing Sheets

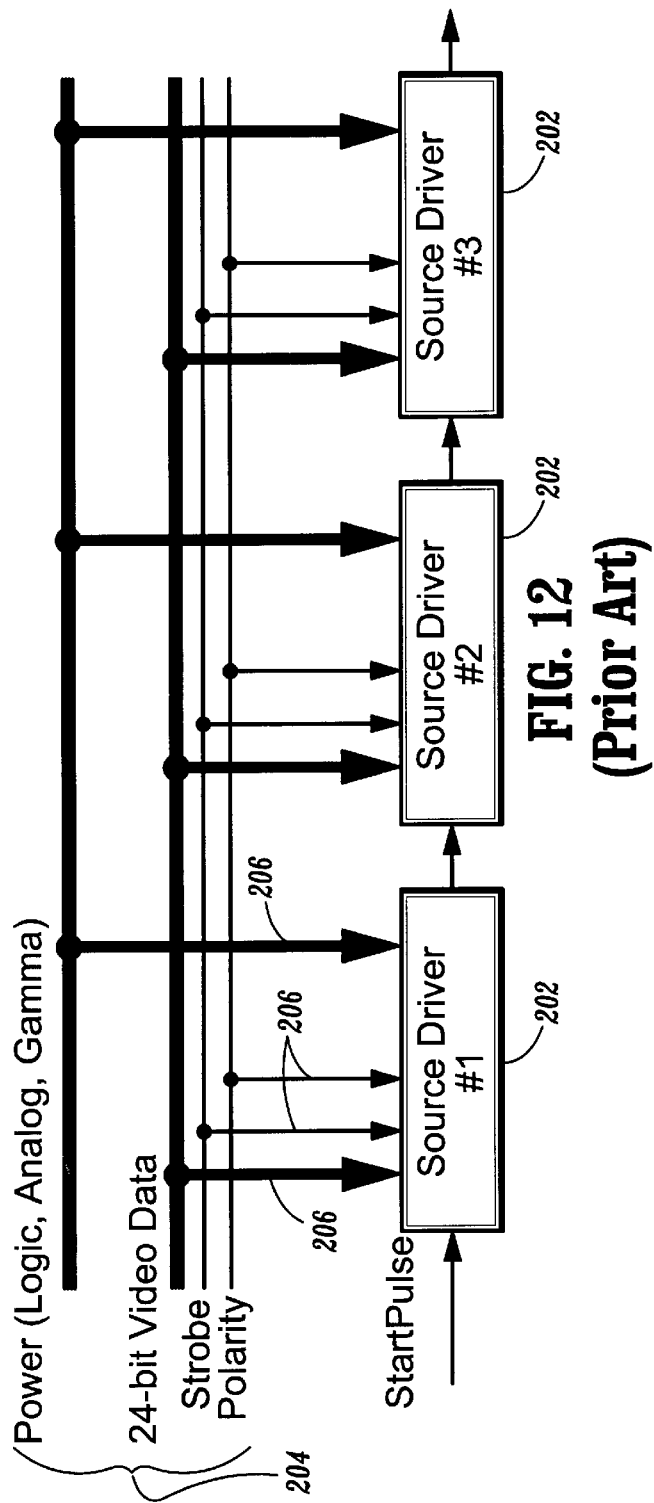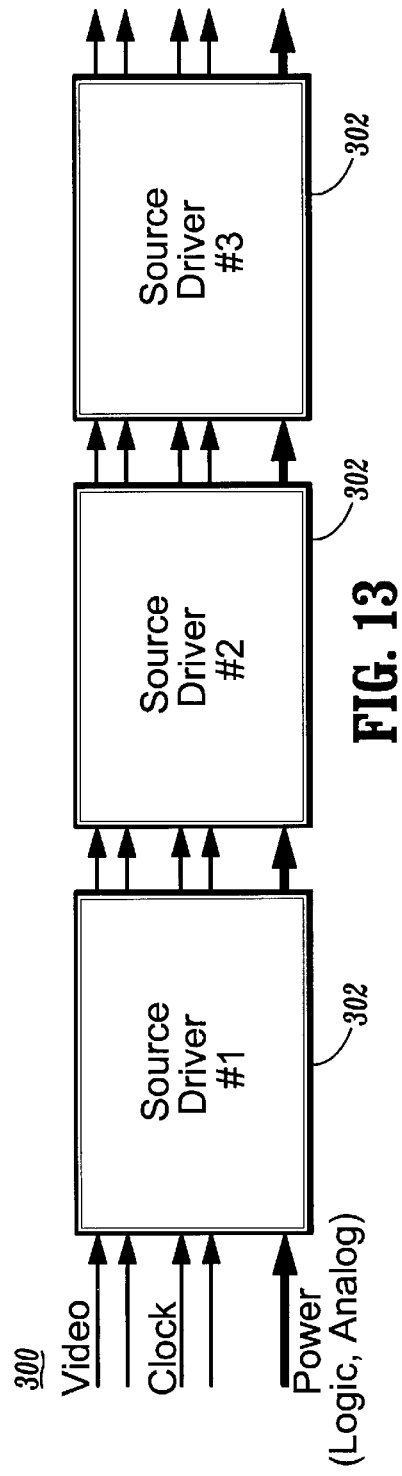

LOW RESISTANCE WIRING IN THE PERIPHERY REGION OF DISPLAYS

BACKGROUND OF THE INVENTION

1. Field of the Invention

The present invention relates to display devices, and more particularly to liquid crystal displays having additional wiring formed in a periphery region outside of the pixel array of the display. The additional wiring may be employed for a plurality of applications, such as driver chip wiring on the array, connecting gate metal to signal (or data) metal, etc. A simple, low cost fabrication method is disclosed.

2. Description of the Related Art

Active matrix displays typically include a pixel array, which includes a plurality of pixels arranged to form a matrix. A region surrounding the pixel array is often referred to as the periphery region. The periphery region includes support circuitry or connections to chips or other devices which provide power and addressing signals to the array of pixels.

For active matrix liquid crystal displays (AMLCDs), it is desirable to have low resistance wiring in the periphery region where the driver chips are attached so that an additional external circuit board is not needed to provide power and data signals to the driver chips if the chips are mounted directly on the glass (chip on glass (COG)). An additional low resistance wiring level and low resistance connections between the existing wiring levels (such as gate metal and data (or signal) metal) is desirable when additional functions, such as next generation array test (see, e.g., M. Kodate et al, "Next generation TFT array testing for high resolution high content AMLCDs", SID '99 Digest, pp. 72–75), or integrated drivers are employed (see, e.g., F. P. Cuomo et al, "Sub-notebook a-Si color SVGA display with integrated drivers", SID '98 Digest, pp. 967–970).

Current amorphous Si AMLCD manufacturing processes typically use 4 or 5 photolithography mask levels to make the TFT array, (see H. Kitahara, E. G. Colgan, and K. Schleupen, "Technology Trend of Large Size and High Resolution Direct View TFT-LCD", SID '00 Digest, pp. 1108–1111 and C. W. Kim, Y. B. Park, H. S. Kong, D. G. Kim, S. J. Kang, J. W. Jang, and S. S. Kim, "A Novel Four Mask Count Process Architecture for TFT LCDs" SID '00 Digest, pp. 1006–1009). In these processes, and many other low mask count processes, the transparent pixel electrode is the final conductor patterned and is used to interconnect between the gate metal and data metal, if such connections are needed.

For large size, high resolution displays, a planarizing polymer layer is used underneath the pixel electrode so that the aperture ratio of the display can be increased, as in T. Ueki, "Requirements for Large Size and High Resolution TFT-LCDs", IDMC '00 Digest, page 177–180. For a first level of metal (either gate metal or data metal) on a thin film transistor (TFT) array, the thickness is limited to about 300 nm because the lines fabricated from a second level of metal (either data or gate metal) must cross-over the first level lines numerous times with no shorts. The thickness of the second layer of metal is limited to about 400 nm if a planarizing polymer layer is not used since a passivation layer must fully cover the second metal layer in the array region.

A typical low resistance material used for gate and data metal is Al(Nd) (see e.g., H. Takatsuji, et al., "Nanometer scale investigation of Al based alloy films for thin film transistor liquid crystal display arrays," Mat. Res. Soc. Symp. Proc. Vol. 471, pp. 99–104, 1997) which has a resistivity of about 3.5 microOhm-cm. This corresponds to 0.12 Ohm/square with a thickness of 300 nm and 0.09 Ohm/square with a thickness of 400 nm. Even with these layers stacked (resulting in a sheet resistance of about 0.05 Ohm/square), this is not low enough resistance for some of the desired applications.

Additionally, a practical layout frequently needs low resistance connections between gate metal and data metal which are presently connected through a high resistance transparent pixel electrode material (typically, Indium Tin Oxide, ITO, with a sheet resistance of about 50 Ohms/square). It is also undesirable to add an additional photolithography (mask) step to pattern an additional metal layer because of the high cost.

Therefore, a need exists for an additional low resistance wiring level and a method for fabrication which also provides connections between gate metal and data metal without additional photolithography steps. A further need exists for low resistance wiring in a periphery region of a display which does not impact pixel operation.

SUMMARY OF THE INVENTION

A display device and method for fabrication are disclosed. A gate metal and a data metal are formed in an array region and in a periphery region outside of the array region of the display device. A planarizing layer is formed over the array region and the periphery region, and vias are patterned into the planarizing layer in the array region and the periphery region to expose portions of at least one of the gate metal and the data metal. A transparent conductor is deposited in the array region and the periphery region.

A metal layer is locally deposited over the transparent conductor in selected areas of the periphery region. Then, using a same lithographic pattern, the metal layer and the transparent conductor are patterned to form an additional low resistance wiring level and connections between the gate metal and the data metal in the periphery region and to form pixel electrodes in the array region.

Another display device includes an array region including pixel cells, the pixel cells including metal lines. A periphery region is disposed outside of the array region, the periphery region including the metal lines which extend from the array region. A wiring layer is formed on the metal lines in the periphery region, the wiring layer including a layered stack. The stack includes a transparent conductor layer and an opaque metal layer.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein:

FIG. 12 is a schematic diagram showing driver chip connections in accordance with the prior art; and FIG. 13 is a schematic diagram showing cascaded driver chip connections enabled in accordance with the present invention.

DETAILED DESCRIPTION OF PREFERRED EMBODIMENTS

The present invention provides display fabrication methods and display devices fabricated in accordance therewith. The present invention provides liquid crystal displays with additional low resistance wiring structures, preferably formed in a periphery region outside of the pixel array of the display. The present invention adds a thick low resistance metal deposition, for example, Mo/Al(Nd)(600 nm)/Mo, through a metal mask in the periphery (outside an array area of the display). The low resistance metal deposition is preferably performed after the material for a transparent electrode (e.g.,ITO) is deposited but prior to a photolithography step used to pattern the transparent electrode.

Advantageously, the low resistance metal is patterned prior to patterning the transparent electrode and the metal may be defined in the desired pattern in the periphery region using the same photolithography step as forms the transparent pixel electrodes in the array region. Since the additional metal is present outside the array region, the metal does not block transmission of light through the pixel electrodes and thus permits very low resistance additional wiring in the periphery region.

The present invention which combines a masked or localized deposition of thick metal (see, e.g., localized deposition of metal as described by H. Herman, S. Sampath, and R. McCune in "Thermal Spray: Current Status and Future Trends", MRS Bulletin, pp. 17–25, July 2000) onto the pixel electrode material prior to lithography may be used with any thin film transistor (TFT) array fabrication process. The present invention is preferably employed for processes where the transparent pixel electrode is the last conductor formed so that no other conductor layer is required to cross-over thick metal lines outside the array region.

The present invention may be employed for a plurality of applications such as forming an additional low resistance wiring level in the periphery region, connecting gate metal to data metal or "strapping" existing gate or data metal to reduce resistance. It is to be understood that connections between gate metal and data metal, data metal to data metal, gate metal to gate metal or an addressing line (data or gate metal) to bond pads for electrical connections to the display may be included in the additional wiring. Methods for fabrication in accordance with the present invention provide improved performance for low cost and other advantages. The low resistance wiring of the present invention is useful for amorphous Si active matrix displays and polycrystalline Si active matrix displays, especially where it is more common to integrate additional functions onto the array. Other types of arrays may also benefit from the present invention.

It is noted at the outset that the following describes a particular pixel (subpixel) cell fabrication process. The pixel cell is illustratively described. Other structures and processes may be employed to form the pixel cell.

Figure 2:
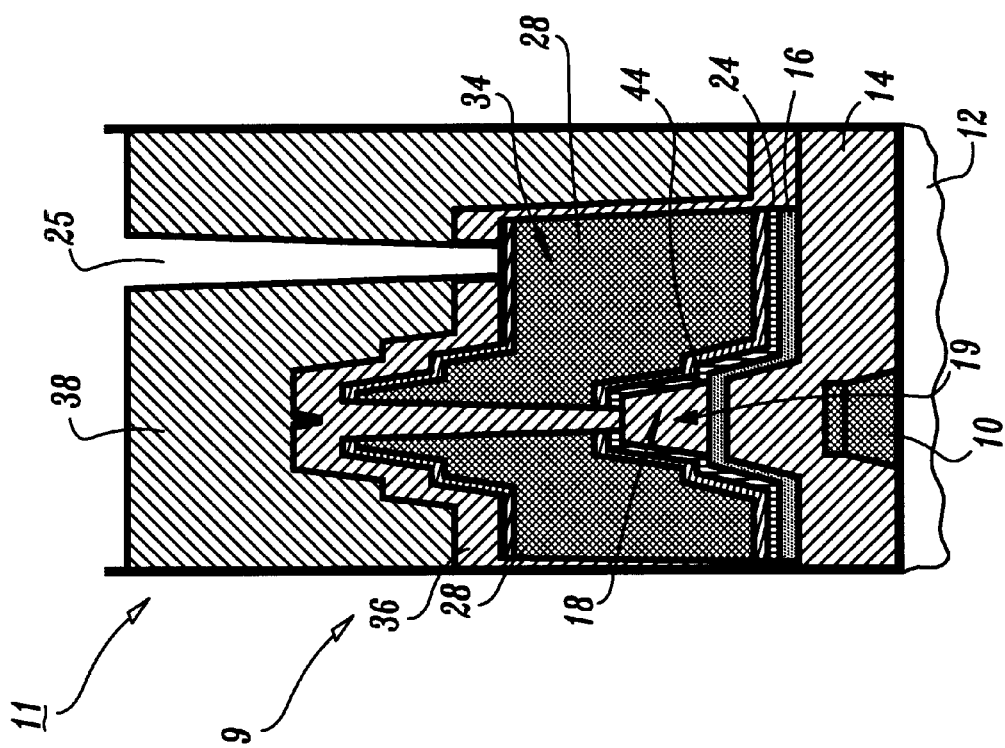
FIG. 2 is a cross-sectional view of the pixel (subpixel) cell of FIG. 1 taken at section line 2—2 in accordance with the present invention.
Figure 1:
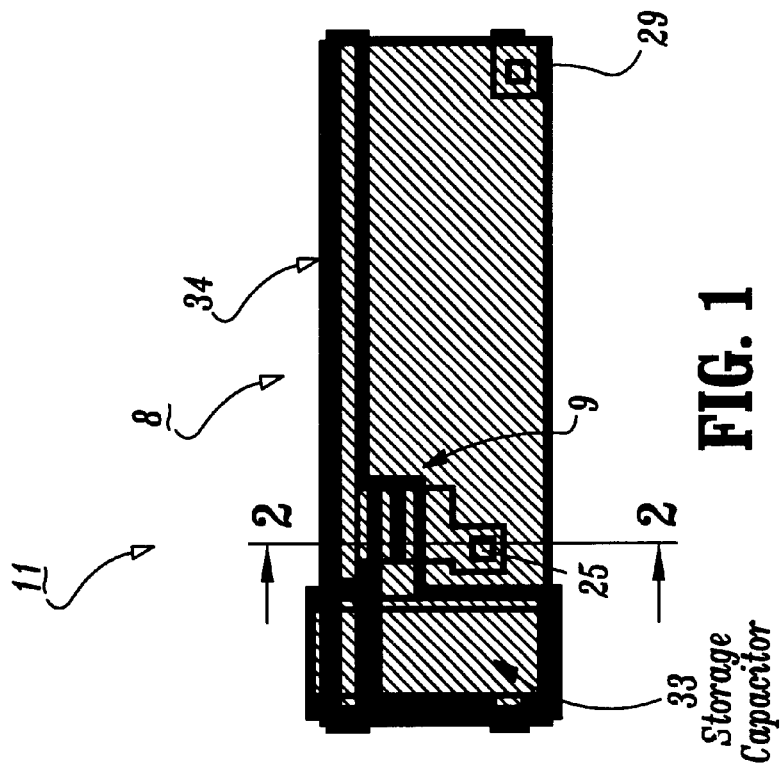
FIG. 1 is a top view of pixel (subpixel) cell showing a planarization layer having vias formed therein in accordance with the present invention.

Referring now in detail to the figures in which like numerals represent the same or similar elements and initially to FIGS. 1 and 2, a pixel cell 8 for a liquid crystal display device 11 is shown. FIG. 1 is a top view of a partially fabricated pixel cell 8, and FIG. 2 is a cross-sectional view of a partially fabricated transistor region including a thin film transistor 9 for pixel cell 8 taken at section line 2—2 of FIG. 1. A gate electrode 10 is defined on a substrate 12. Substrate 12 preferably includes a transparent material, such as, glass, quartz or plastic. Gate electrode 10 is formed by a metal or conductor deposition and patterned lithographically. Gate electrode 10 is preferably formed from an opaque material, and gate electrode 10 may be a single conductive layer of a metal such as chromium (Cr), tungsten (W), aluminum (Al), copper (Cu) and other electrically equivalent conductors, multilayer structure of metals in a capped or clad arrangement, such as, chromium above and/or below Al (Cr/Al), Molybdenum above and/or below Al (Mo/Al), and other similar conductors, and alloy structures, including, for example, several percent of Neodymium in Aluminum, etc. Gate electrode 10 preferably includes tapered edges to increase step coverage of overlying materials.

A trilayer structure is formed which includes a dielectric layer 14, a semiconductor layer 16 and a dielectric layer 18. Dielectric layers 14 and 18 need not be the same material. Dielectric layers 14 and 18 may include, for example, silicon nitride, silicon oxide, silicon oxynitride, aluminum oxide, tantalum oxide, plasma deposited or reactively sputtered silicon oxide (SiOx), spin-on-glass, organic materials, such as, polyamide or BCB, or high-k dielectrics, such as, Barium Strontium Titanium oxide (BST), Barium Zirconium Titanium oxide (BZT), and tantalum pentoxide or combination thereof. Dielectric layers 14 and 18 may each include multi-layers, for example, $SiN_x$, $SiN_x/SiO_y$, $SiN_x/SiO_y/SiN_x$. These layers may be prepared by anodization and/or by plasma enhanced chemical vapor deposition (PECVD), electron cyclotron resonance CVD, laser-assisted CVD, or sputtering. Semiconductor layer 16 may include amorphous silicon (a-Si or a-Si:H), polycrystalline silicon or other layer of semiconductor material for forming a channel for the transistor.

Etching of dielectric layer 18 is performed to leave a portion 19 of dielectric layer 18 centered over gate electrode 10. Portion 19 may be referred to as a channel insulator, an Istop or a top insulator. Portion 19 preferably includes tapered edges.

A doped semiconductor layer 24 is then deposited. Semiconductor layer 24 may include heavily doped amorphous silicon, microcrystalline or polycrystalline silicon. Layer 24 is preferably n+ doped; however, p-doping may also be performed. Layer 24 may be plasma deposited by employing a plasma enhanced chemical vapor deposition (PECVD) process. Layer 24 contacts layer 16 beyond the edges of portion 19. A conductive layer 28 is deposited on doped semiconductor layer 24. Conductor layer 28 may include Indium Tin Oxide (ITO) or Indium Zinc Oxide (IZO), aluminum, aluminum alloys, clad aluminum, molybdenum, chromium, moly-tungsten, and/or copper. Conductor 28 may be sputtered on doped layer 24. Conductor 28 may include multiple conductive layers, for example a Mo/Al/Mo sandwich structure (e.g., Mo clad Al) or equivalent conductive materials.

Conductor 28 is patterned to form a signal line 34 (or data lines). Signal line 34, capacitor electrode 33 (FIG. 1) and all other devices which are formed from conductor 28 are simultaneously patterned. Conductor layer 28 and doped semiconductor layer 24 are etched in accordance with a resist pattern such that a drain electrode 42 and a source electrode 44 are formed and are aligned to gate electrode 10. In preferred embodiments, the etching of layer 28 is performed by a wet etching process. In one embodiment, the etching uses a mixture of phosphoric, acetic and nitric acids known as a PAN etch for aluminum, Al alloys and molybdenum metals. The etching of layers 24 and 16 is preferably performed by dry etching.

A dielectric layer 36, e.g., silicon nitride may optionally be deposited. Layer 36, if present, is employed as an inorganic dielectric ion barrier layer. A transparent planarizing polymer layer 38, for example, an acrylic resin based material, such as, PC 403, available commercially from JSR, FZT-S100, available commercially from Fujifilm Olin, or, TPAR series, available commercially from Tokyo Oka, is deposited. Even though transparent polymer layer 38 is referred to as planarizing, it is to be understood that only a degree of planarity is achieved and that this process is effective even with minimal planarization. Insulation layer 36 may include, for example, silicon nitride, silicon oxide or other inorganic insulators. Layer 38 may include, for example, an acrylic polymer, polyamide, a transparent polymer or a colored polymer. Transparent polymer layer 38 may be photosensitive in which case a photoresist is not needed to pattern layer 38. Polymer layer 38 and layer 36, if present, are patterned-to open a via 25 to expose a portion of data metal 28, which acts as an etch stop. A second via 29 (FIG. 1) is also formed to connect a pixel electrode 42 (FIG. 8) to a storage capacitor formed on a gate line (gate metal 10) of an adjacent pixel (not shown). Via 29 is only needed if a storage-capacitor-on-gate type design is employed.

Figure 3:
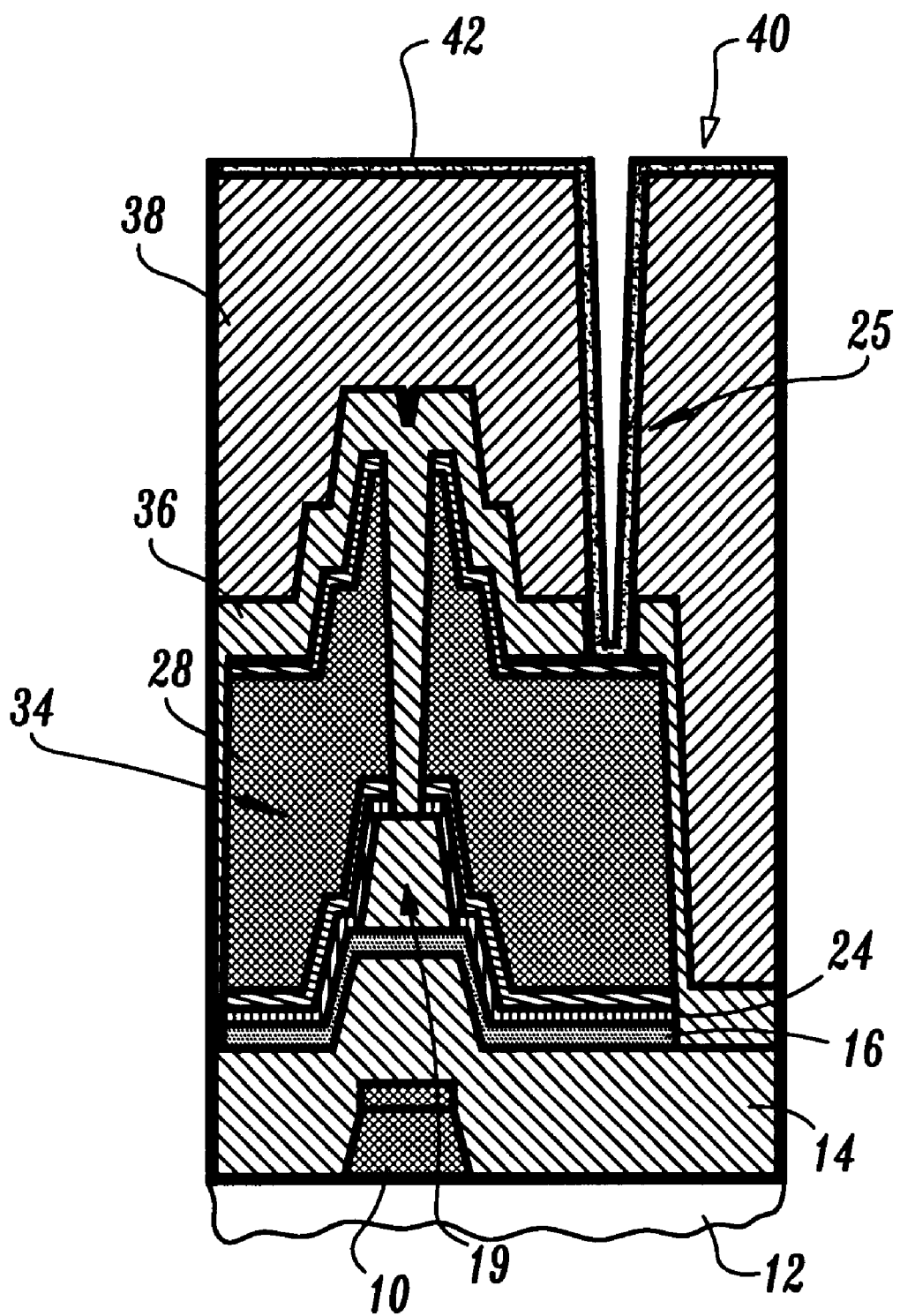
FIG. 3 is a cross-sectional view of the pixel (subpixel) cell of FIG. 2 after a transparent conductor is deposited in accordance with the present invention.

Referring to FIGS. 3, a transparent conductor 42, such as indium zinc oxide (IZO) or amorphous ITO is deposited to form pixel electrode 40 in array region (for pixel cells 8). Via 29 and via 25 are lined or filled with conductor 42 to make appropriate connection to data metal 34 and a capacitor of an adjacent pixel (adjacent pixel and capacitor not shown).

Figure 4:
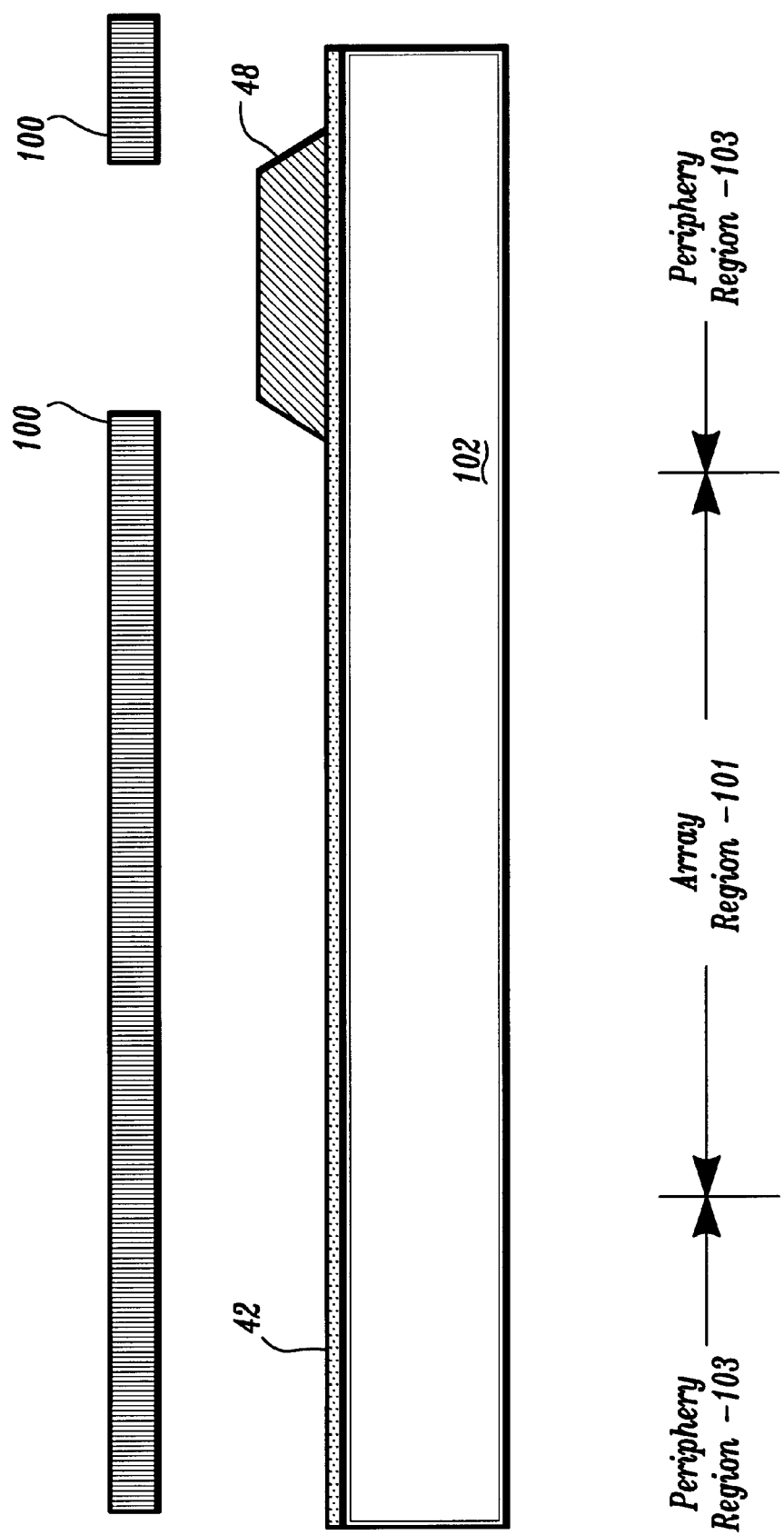
FIG. 4 is a cross-sectional view of a display plate showing a local metal deposition in a periphery region using a metal mask in accordance with the present invention.
Figure 5:
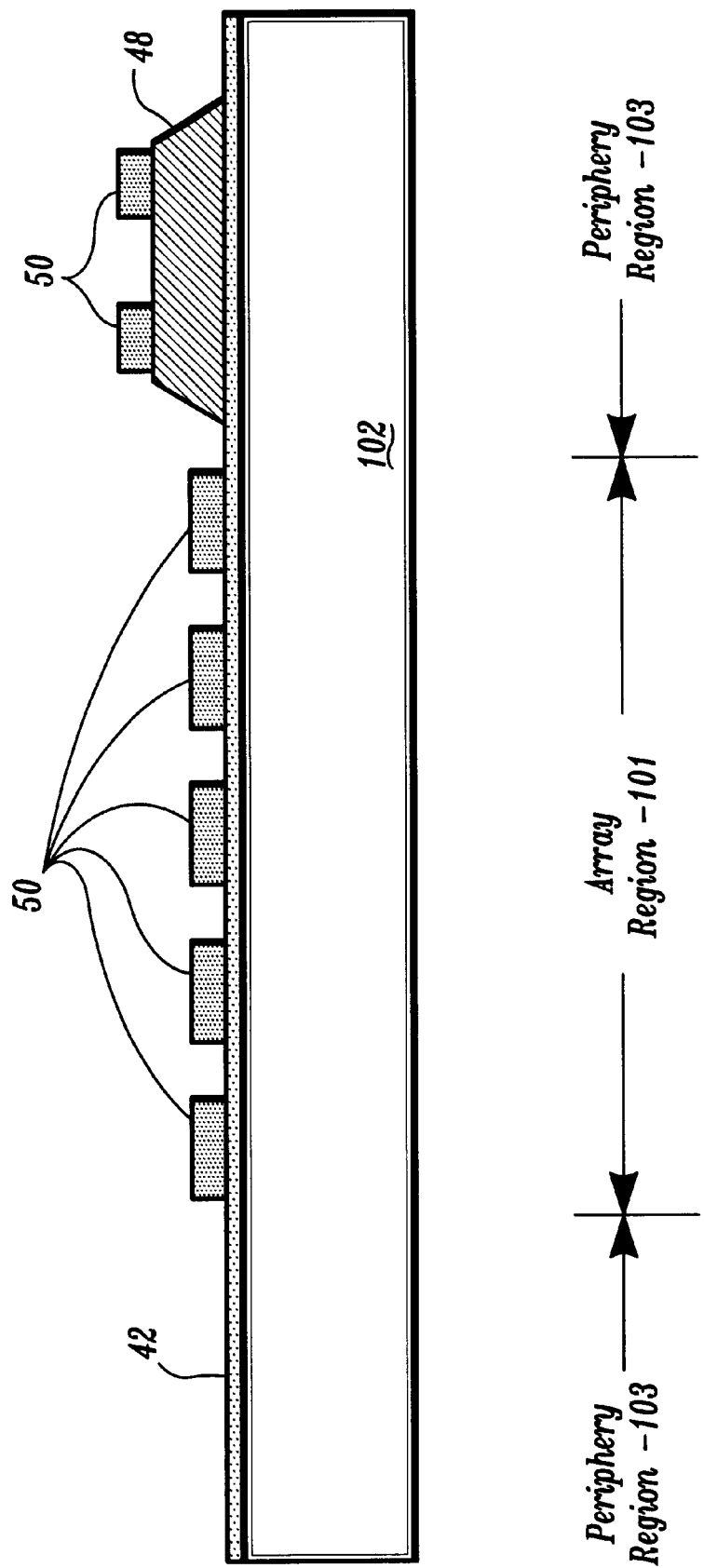
FIG. 5 is a cross-sectional view of the display plate of FIG. 4 showing a photoresist patterned on the local metal deposition and the transparent conductor in accordance with the present invention.

Referring to FIG. 4, a localized deposition of a conductive material 48, for example, Mo/Al (Nd)/Mo or other conductive material layers is performed through a metal mask 100 outside an array region 101. The deposition may include sputtering, evaporation, or other physical vapor deposition methods. In this way, transparent conductor 42 is formed over both the array region 101 and periphery region 103, and conductive material 48 is formed in selected areas of periphery region 103. A plate 102 of a display device is then coated with photoresist 50, exposed and developed as shown in FIG. 5. Plate 102 includes a partially fabricated display device with thin film transistors, gate metal, data metal and other components formed thereon.

Figure 6:
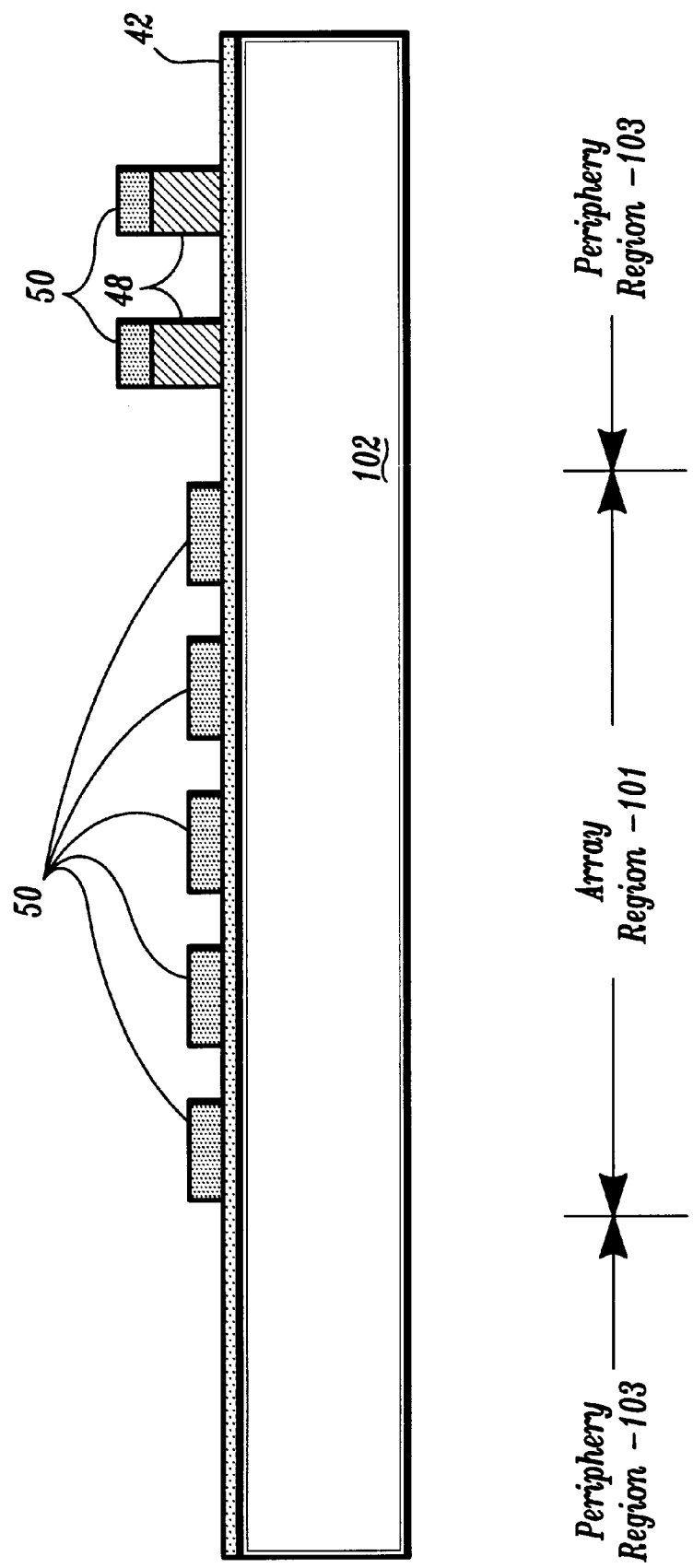
FIG. 6 is a cross-sectional view of the display plate of FIG. 5 showing the local metal deposition etched selectively to the transparent conductor in accordance with the present invention.
Figure 7:
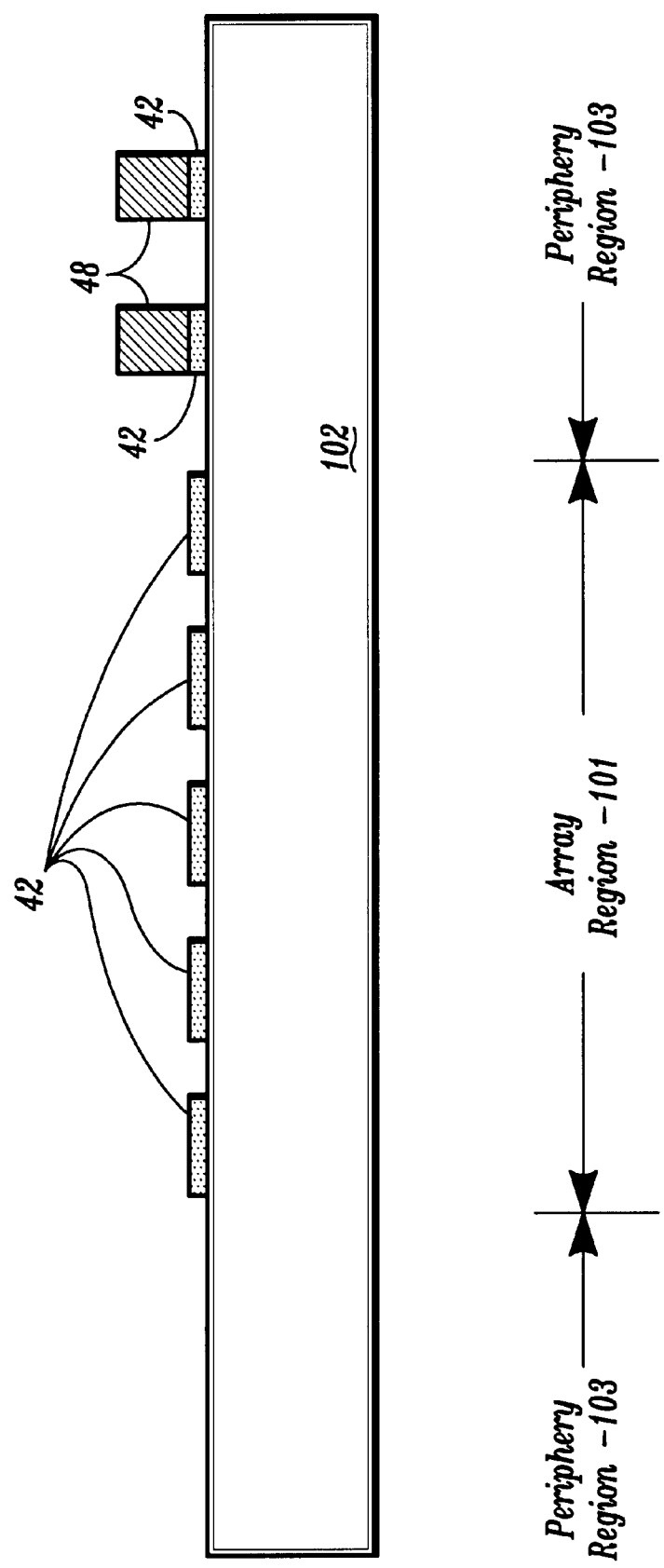
FIG. 7 is a cross-sectional view of the display plate of FIG. 6 showing the transparent conductor etched and the photoresist stripped in accordance with the present invention.

Referring to FIG. 6, photoresist 50 is first employed to etch conductive material 48 using, for example, a wet etch using phosphoric acid, acetic acid, and/or nitric acid. The wet etch advantageously does not etch IZO or amorphous ITO of transparent conductor 42. Next, as shown in FIG. 7, transparent conductor 42 is etched with an etchant which does not attack conductive material 48. In one embodiment, conductive material 48 includes Al and the etchant includes oxalic acid, which does not attack Al (See, e.g., H. Takatsuji et al, "Characterization of Transparent conductors in Indium Zinc Oxide and their application to thin film transistor liquid crystal displays:, Mat. Res. Soc. Symp. Proc. Vol. 508, pp. 315–320, 1998).

Figure 9:
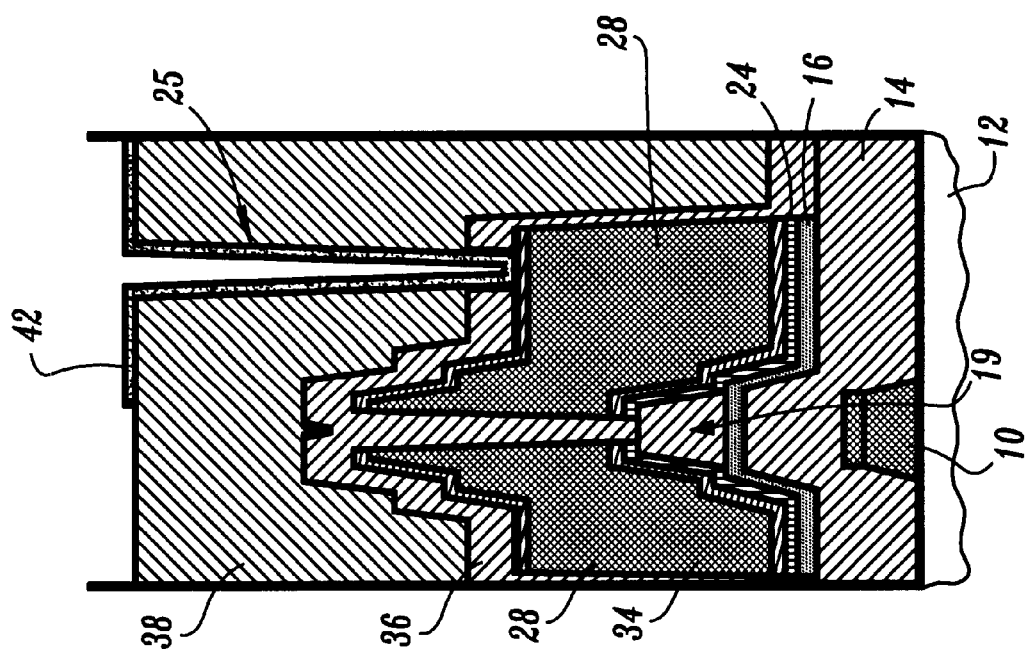
FIG. 9 is a cross-sectional view of the pixel (subpixel) cell of FIG. 8 taken at section line 9—9 in accordance with the present invention.
Figure 8:
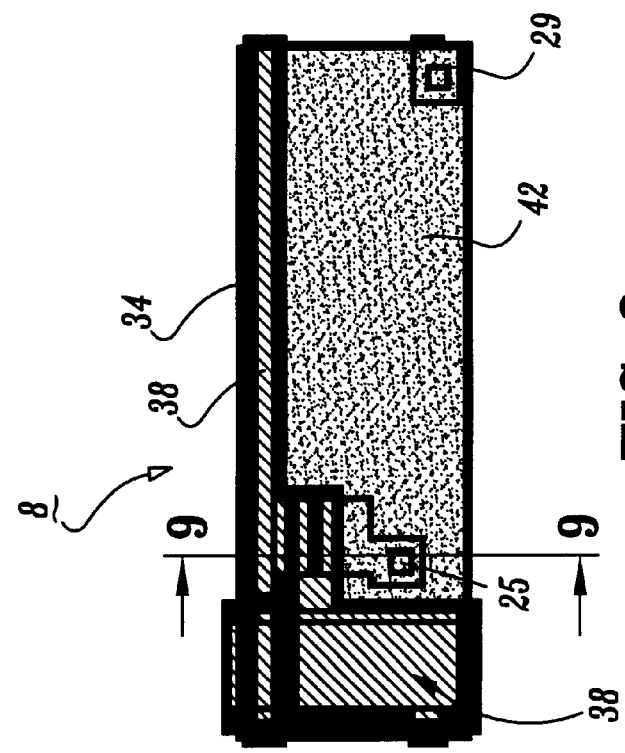
FIG. 8 is a top/plan view of the pixel (sub-pixel) cell showing the transparent conductor patterned in the array region in accordance with the present invention.

Photoresist layer 50 is than stripped. Photoresist 50 is employed to pattern transparent conductor 42 in the array region as shown in FIGS. 8 and 9 where a completed pixel is depicted in a plan view and a cross-sectional view, respectively.

Figure 10:
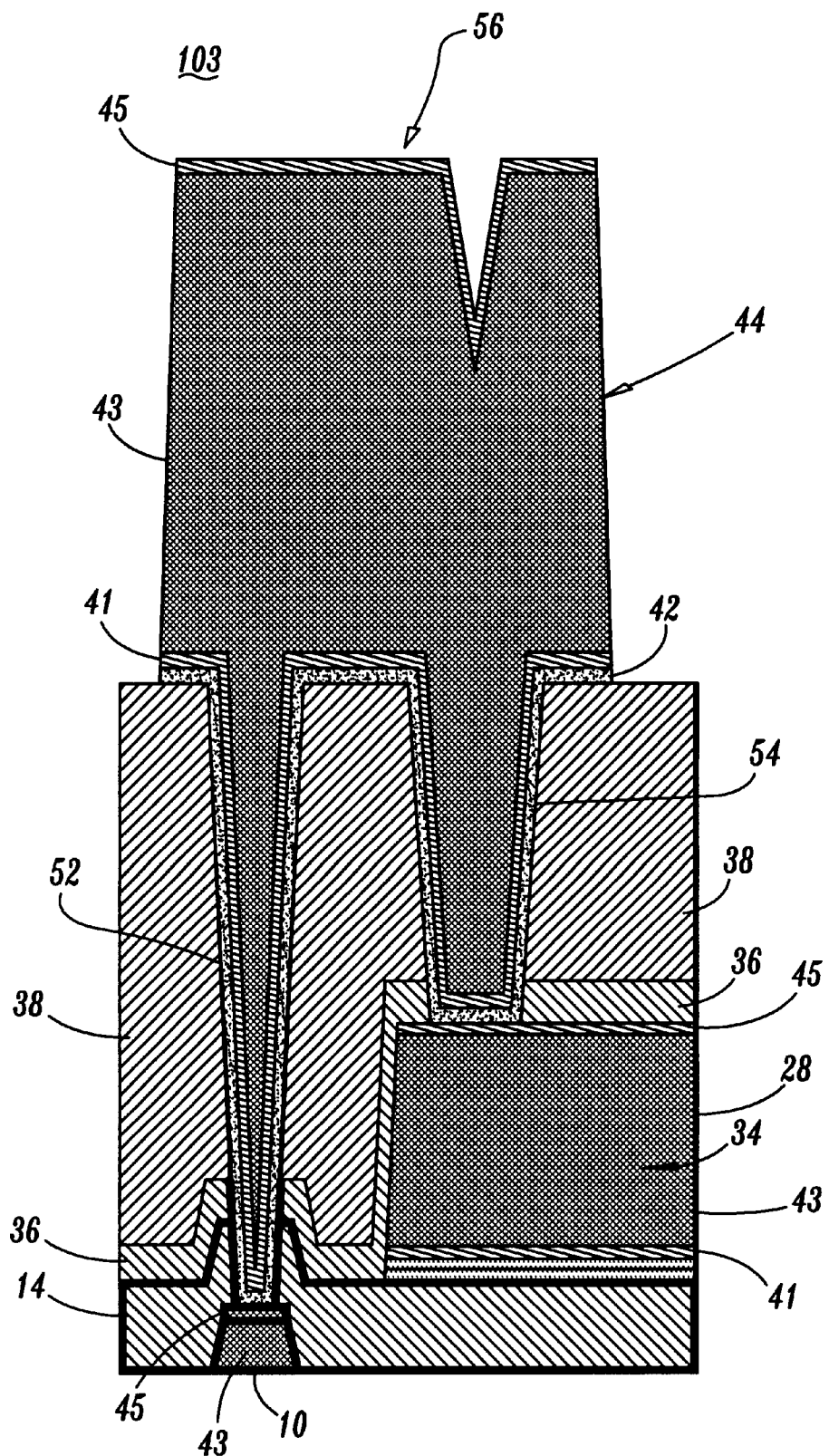
FIG. 10 is a cross-sectional view of a region of the periphery showing a low resistance connection between data metal and gate metal in accordance with the present invention.

Referring to FIG. 10, a cross-sectional view taken through a portion of the periphery region is illustratively shown. Vias 52 and 54 are formed along with vias 25 and 29 (FIGS. 1 and 2). Via 52 is formed through layers 14, 36 and 38 to gain access to gate metal 10. Via 54 is formed through layers 36 and 38 to gain access to data metal 28 of data line 34 (FIG. 1). FIG. 10 shows a low resistance connection 56 between gate metal 10 and data metal 28 in the periphery region 103 (outside array region 101), which includes transparent conductor 42 and conductive material 44. Conductive material 44 preferably includes a layer of Mo 41, a layer of Al 43 and a layer of Mo 45. These metals may also be employed for data metal 28 and gate metal 10. Note that outside array region 101, gate metal 10, data metal 34 and transparent conductor 42 covered with conductive material 44 can be used separately for routing wires or in combination for the lowest possible resistance between the points to be electrically connected.

Figure 11:
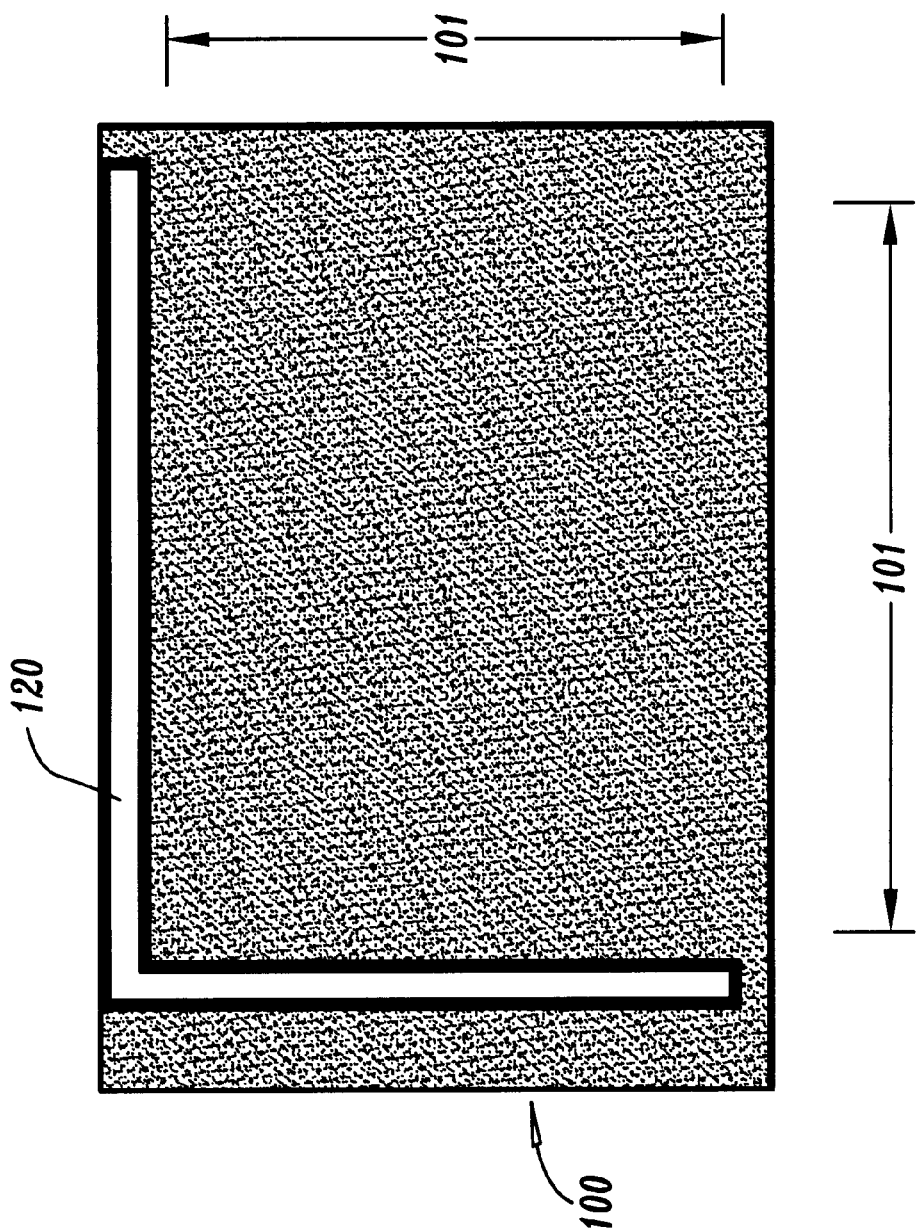
FIG. 11 is a plan view of a metal mask which may be employed to locally deposit an opaque metal for low resistance interconnections in accordance with the present invention.

Referring to FIG. 11, a plan view of an illustrative metal mask 100 is shown for localized metal deposition. Metal mask 100 may be used to limit the additional low resistance metal deposition to areas outside of an array region 101. An opening or pattern 120 in mask 100 provides a region through which metal can be locally deposited. The metal mask pattern may be repeated as needed to form a plurality of displays simultaneously from a single mother glass sheet. For example, a mother glass sheet may include four displays. The metal mask pattern may be repeated four times so that the four display plates are processed at the same time on the mother glass sheet. In this embodiment, the low resistance wiring provided by conductive material 44 is needed on only two sides (covered by the L-shaped pattern 120) where electrical interconnections to the display are to be made. Additionally, gate metal and data metal connections, or low resistance wiring for power or signal distribution, or connection for short distance wiring for cross-overs or fan-outs may be provided in accordance with the present invention.

Referring to FIG. 12, a 15" SXGA+ panel includes, e.g., ten data driver chips 202 (only three shown for simplicity)

wired in accordance with the prior art. Each chip 202 receives Power, Video Data, Strobe (clock) and Polarity signals from a plurality of wires 204 on a printed circuit board running parallel to chips 202. The individual outputs of chips 202 are connected onto the appropriate data lines of the display using an anisotropic conducting film.

Referring to FIG. 13, a data driver chip wiring scheme 300 which employs the present invention is illustratively shown. Since low resistance wiring connections can be made in the periphery region in accordance with the present invention, signal lines (Video and Clock) and power (Power) lines provide cascaded connections to chips 302, which are directly attached to the display, as shown, and a printed circuit board is no longer needed. Advantageously, significant layout area savings are achieved.

With CMOS technology using low voltage differential signaling, a total of, say, 11 wires will be needed for signals (6 for video, 2 for clock and 3 for control) along with Power/Ground for both analog and digital (4 additional lower resistance connections). With the prior art process, the data metal has a sheet resistance of about 0.15 Ohm/square and the analog power/GND would be >600 microns wide and the digital power/GND would be >500 microns wide, which are unacceptably wide. By lowering the resistivity of the combined data metal, gate metal and additional low resistance wiring, in accordance with the present invention, the width is proportionally reduced. For example, with 500 nm of pure Al for conductive material 44, the sheet resistance would be 0.06 Ohms/square for the additional low resistance wiring alone, so the required width would be 0.4 times less than described above, or even less by combining multiple conductor layers.

Having described preferred embodiments of a low resistance wiring in the periphery region of displays and method for fabrication (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A display device, comprising:
    an array region including pixel cells, the pixel cells including metal lines and a transparent pixel electrode;
    a periphery region disposed outside of the array region, the periphery region including the metal lines and the transparent pixel electrode, the metal lines extending from the array region; and
    at least one connection between the metal lines in the periphery region, the at least one connection including a layered stack, the stack including the transparent pixel electrode disposed beneath an opaque metal layer, wherein in the periphery region, the transparent pixel electrode and the opaque metal layer have substantially the same pattern.

2. The display device as recited in claim 1, wherein the at least one connection is formed through a planarizing layer formed over the array region and the periphery region.

3. The display device as recited in claim 2, further comprising an insulation layer formed below the planarizing layer.

4. The display device as recited in claim 1, wherein the at least one connection is formed through a via in the periphery region.

5. The display device as recited in claim 1, wherein the metal lines include at least one of gate metal and data metal.

6. The display device as recited in claim 5, wherein the at least one connection connects one of the gate metal and data metal to one of the gate metal and the data metal in the periphery region.

7. The display device as recited in claim 1, wherein the opaque metal layer includes Aluminum.

8. The display device as recited in claim 1, wherein the opaque metal layer includes a Molybdenum/Aluminum/Molybdenum stack.

9. The display device as recited in claim 1, wherein the transparent pixel electrode includes at least one of indium tin oxide and indium zinc oxide.

10. A display device, comprising:
    an array region including pixel cells, the pixel cells including metal lines and a transparent pixel electrode;
    a periphery region disposed outside of the array region, the periphery region including the metal lines and the transparent pixel electrode, the metal lines extending from the array region; and
    a wiring layer formed on the metal lines in the periphery region, the wiring layer including a layered stack, the stack including the transparent pixel electrode disposed beneath an opaque metal layer, wherein in the periphery region, the transparent pixel electrode and the opaque metal layer have substantially the same pattern.

11. The display device as recited in claim 10, wherein the wiring layer is formed on a planarizing layer formed over the array region and the periphery region.

12. The display device as recited in claim 11, further comprising an insulation layer formed below the planarizing layer.

13. The display device as recited in claim 10, wherein the metal lines include at least one of gate metal and data metal.

14. The display device as recited in claim 13, wherein the wiring layer connects one of the gate metal and data metal to one of the gate metal and the data metal in the periphery region.

15. The display device as recited in claim 10, wherein the opaque metal layer includes Aluminum.

16. The display device as recited in claim 10, wherein the opaque metal layer includes a Molybdenum/Aluminum/Molybdenum stack.

17. The display device as recited in claim 10, wherein the transparent pixel electrode includes at least one of indium tin oxide and indium zinc oxide.

* * * * *